Jan. 9, 1934.   W. G. BECK   1,942,505
WINDING MEANS FOR SPRING MOTORS
Filed May 28, 1931
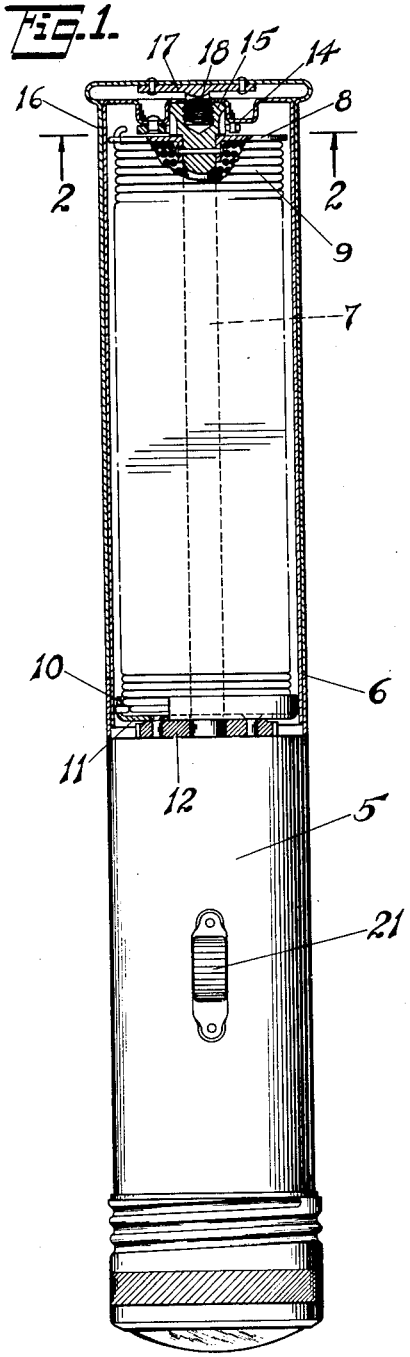
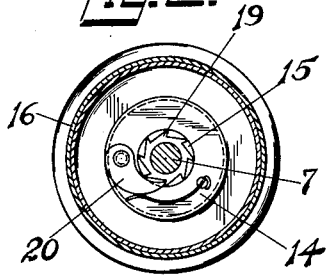
INVENTOR
William G. Beck
BY his ATTORNEYS Patented Jan. 9, 1934

1,942,505

UNITED STATES PATENT OFFICE 1,942,505

WINDING MEANS FOR SPRING MOTORS

William G. Beck, New York, N. Y.

Application May 28, 1931. Serial No. 540,616

3 Claims. (Cl. 185—39)

This invention relates to winding means for spring motors and more particularly to winding means for mechanical flashlights.

It is an object of the invention to provide winding means for spring motors that is simple in construction and that is easily assembled.

With this and other objects in view, the invention consists in the features, combinations, details of construction and arrangements of parts which will first be described in connection with the accompanying drawing and then more particularly pointed out.

In the drawing:

Fig. 1 is a longitudinal sectional view of a winding device constructed in accordance with the invention.

Fig. 2 is a sectional view taken on the line 2—2 of Fig. 1.

Referring to the drawing, the invention is illustrated, as an example, in connection with a mechanical flashlight. The flashlight comprises a unitary closed casing indicated generally by 5. As here shown as an example, the casing is formed of two overlapping parts brazed or welded together along the overlap to form a unitary structure and to have a shoulder 6 later referred to.

Enclosed within the casing is a spring motor. As here shown as an example, pinned to a shaft 7 is a washer 8. Coiled about the shaft is a motor spring 9, one end of which is hooked into a hole in washer 8. The other end of the spring is hooked into a flange 10 on a washer 11. Secured to the latter is a driving gear 12 rotated by the unwinding of the spring and capacitated to drive any desired mechanism, e. g., the generator of a flashlight.

There is provided a step bearing for the shaft 7 in the end of the casing. Although capable of various constructions, in that here illustrated as an example, the casing is in the form of a drawn shell and its closed end is provided with a struck-up annular bead 14, forming a step bearing. The shaft has an enlarged foot portion 15 rotatably seated in this bearing.

There is provided a winding element comprising a hand-grip. In the present exemplification, the winding element comprises a cup-shaped shell 16 rotatably telescoped over one end of the casing. In embodiments in which the casing has the shoulder above referred to, the winding cup is of substantially the same metal gauge as the casing and its rim is in close proximity to said shoulder, thus giving the complete device a flush surface.

There is provided an operating connection between the hand-grip and the spring motor. As here shown as an example, secured in the bottom of the cup-shaped winding element 16 is a plate 17 having a threaded stud 18. This stud passes through a suitable hole in the end of the casing and has a threaded connection in a tapped recess in the foot of the shaft. This threaded connection facilitates assembly and disassembly.

In operation, the motor spring is wound by rotating the cup-shaped hand-grip 16. This turns shaft 7 and hence washer 8 to wind the spring. During winding, the other end of the spring and its associate parts are held against movement in any suitable manner, for example, by a thumb-catch 21 controlling the driven parts of a mechanical flash light. To prevent reverse movement of the shaft, a pawl and ratchet are provided. As here shown as an example, the foot of shaft 7 is formed with ratchet teeth 19 engaged by a spring-pressed pawl 20 carried by bead 14.

With the construction described, the winding element is distinct from the casing. This permits the spring motor and the driven parts to be assembled in a unitary casing independently of the winding mechanism. Then cup-shaped element 16 is assembled, its pin being threaded into the end of the shaft by rotating the cup until full engagement is effected. Thereafter, rotation of the cup winds the spring. The cup-shaped element 16 provides a convenient hand-grip and the spring motor and driven parts are enclosed in a unitary casing independent of the hand-grip.

What is claimed is:

1. In combination, a closed casing, a shaft, a coiled motor spring, and a bearing for said shaft enclosed within said casing, the end of said shaft having a tapped recess, the casing having a hole registering with said recess, a cup-shaped winding element rotatably telescoping over the end of said casing, and a threaded stud in said cup-shaped element passing through said hole and threaded into said recess.

2. In combination, a closed casing, the end of the casing having a struck-up annular bead forming a step bearing, a shaft having a foot portion rotatably seated in said bearing, a motor spring connected with said shaft, a cup-shaped winding element rotatably telescoping the closed end of the casing, and a stud in said winding element passing through a hole in the casing and having threaded engagement in a tapped hole in the foot portion of the shaft.

3. In combination, a unitary closed casing having two overlapping parts secured together, said overlap forming a shoulder intermediate the ends of the casing, a spring motor entirely enclosed within the casing, a shaft for the spring motor provided at one end with a tapped recess, the tapped end of the shaft terminating adjacent one end of the casing, a struck up annular bead carried by the end of the casing and forming a step bearing for the shaft, said step bearing provided with an opening in registration with the tapped opening in the shaft, a cup-shaped winding element rotatably telescoping over the end of said casing and terminating adjacent the shoulder on said casing formed by the overlapping parts, and a threaded stud carried by the end of the winding element for insertion within the opening in the end of the casing and into threaded engagement with the tapped recess in the shaft.

WILLIAM G. BECK.